United States Patent Office.

WASHINGTON L. GILROY, OF PHILADELPHIA, PENNSYLVANIA.

Letters Patent No. 98,758, dated January 11, 1870; antedated January 1, 1870.

IMPROVED PROCESS OF PRESERVING GREEN CORN.

The Schedule referred to in these Letters Patent and making part of the same.

To all whom it may concern:

Be it known that I, WASHINGTON L. GILROY, of the city of Philadelphia, in the State of Pennsylvania, have invented a new and useful Article of Manufacture; and I do hereby declare that the following is a full, clear, and exact description of the same, and of the manner and process of preparing and preserving it for future use, when required.

My invention relates to the separation and preservation of the pure pulp of the grains of green corn in an undried state, as an article of food or diet.

The putting up, in close vessels, of the unskinned grains of green corn, as they are cut from the cob, has been practised, as a business, for several years; but the pure pulp, without the integument or enclosing skins, and enclosed in vessels for future use, in a fresh condition, is believed to be not only new and useful, but valuable and important to the public, as a delicious article of food, and especially to the invalid, as a nourishing and easily-digestible article of diet.

In separating the pure pulp from the grains of green corn on the cob, the implement invented and patented by me, May 25, 1869, is used, and thereby the tops of the grains are rapidly divided or cut across, and the contained pulp forced out. This pulp is then placed in suitable bottles, jars, or cans, and the vessels then hermetically sealed, in the usual manner of putting up fresh green corn for future use.

I do not intend to confine myself to the use of any particular mode or implement in separating the pulp from its enclosure and cob; nor to the use of any particular kind of bottles, jars, or cans, for containing the separated pulp; nor mode of hermetically sealing the vessels; but having fully described my invention,

What I claim as new, and desire to secure by Letters Patent, is confined to the following, viz:

As a new article of manufacture, the pure pulp of green corn, hermetically sealed up, and preserved, in its fresh, succulent state, in suitable vessels, substantially as described, for future use as food.

W. L. GILROY.

Witnesses:
BENJ. MORISON,
R. M. ELLIOTT,
W. W. DOUGHERTY